United States Patent [19]

Kajikawa

[11] Patent Number: 4,818,879

[45] Date of Patent: Apr. 4, 1989

[54] POSITIONING AND MACHINING APPARATUS HAVING A SCANNER FOR CIRCULARLY SCANNING AN OBJECT BY A LIGHT BEAM

[75] Inventor: Toshikazu Kajikawa, Tokyo, Japan

[73] Assignee: NEC Corporation, Tokyo, Japan

[21] Appl. No.: 40,677

[22] Filed: Apr. 21, 1987

[30] Foreign Application Priority Data

Apr. 21, 1986 [JP] Japan .................................. 61-90062

[51] Int. Cl.[4] ............................................. G01N 21/86
[52] U.S. Cl. ...................................... 250/548; 356/401
[58] Field of Search ....................... 250/548, 557, 202; 382/60; 356/400, 401

[56] References Cited

U.S. PATENT DOCUMENTS

| | | | |
|---|---|---|---|
| 4,441,020 | 4/1984 | Sakamoto et al. | 250/202 |
| 4,535,431 | 8/1985 | Bricot et al. | 250/202 |
| 4,578,574 | 3/1986 | Grant et al. | 250/202 |
| 4,642,468 | 2/1987 | Tabata et al. | 250/548 |
| 4,658,127 | 4/1987 | Ferrari | 250/202 |
| 4,701,053 | 10/1987 | Ikenaga | 250/557 |
| 4,710,963 | 12/1987 | Chapman et al. | 250/556 |

Primary Examiner—David C. Nelms
Attorney, Agent, or Firm—Sughrue, Mion, Zinn, Macpeak & Seas

[57] ABSTRACT

In a positioning apparatus wherein a projecting arrangement projects a light beam towards an object which has a mark extending thereon in a predetermined direction, a circularly scanning arrangement is optically coupled to the projecting arrangement to make the light beam circularly scan the object. Whenever the light beam intersects the mark, a particular beam is produced from the mark. Dependent on the particular beam, the object is quickly positioned at a desired position.

10 Claims, 4 Drawing Sheets

POSITIONING AND MACHINING APPARATUS HAVING A SCANNER FOR CIRCULARLY SCANNING AN OBJECT BY A LIGHT BEAM

BACKGROUND OF THE INVENTION

This invention relates to a positioning apparatus for positioning an object member at a desired position and to a machining apparatus, such as a laser beam trimming machine, for machining the object member.

Various positioning apparatus of the type are already known. For example, a positioning apparatus is disclosed in U.S. Pat. No. 4,423,959 issued to Kiwao Nakazawa et al and assigned to Nippon Kogaku K.K. The positioning apparatus includes a projecting device which is for projecting a light beam towards an object member, such as a semiconductor wafer. The object member has a mark which is provided on a part thereof. In the positioning apparatus of the example, the mark is composed of a group of short line segments which are aligned in one direction.

In order to carry out positioning operation of the object member, the light beam linearly scans the object member in another direction which is selected in compliance with a relative movement between the object member and the projecting device. In response to the light beam, the mark produces a particular beam which is called a diffracted beam in the apparatus according to the Nakazawa et al patent. The diffracted beam has a maximum intensity when the light beam intersects the mark. Responsive to the maximum intensity, it is possible to carry out the positioning operation about the object member.

However, it is incapable to quickly carry out the positioning operation of the object member in the positioning apparatus of the type. This is because scanning is carried out depending on the relative movement between the object member and the projecting device. More particularly, judgement can not be made until completion of the scanning by the relative movement about whether or not the diffracted beam has the maximum intensity.

Such a positioning apparatus can be included in a machining apparatus, such as a laser beam trimming machine. In that case, it is a matter of course that the machining apparatus is incapable of quickly machining a predetermined position of the object.

SUMMARY OF THE INVENTION

It is therefore an object of the present invention to provide a positioning apparatus which is capable of quickly positioning an object member at a desired position without reduction of accuracy of the desired position.

It is another object of this invention to provide a machining apparatus which is capable of quickly machining an object member.

Other object of this invention will become clear as the description proceeds.

According to an aspect of this invention, there is provided a positioning apparatus for use in positioning an object which has a mark extending thereon in a first predetermined direction, the positioning apparatus comprising moving means for moving the object in a second predetermined direction which intersects the first predetermined direction, projecting means for projecting a light beam towards the object, circularly scanning means optically coupled to the projecting means for circularly scanning the object by the light beam to make the mark produce a particular beam whenever the light beam intersects the mark, detecting means for detecting the particular beam to produce a mark detection signal representative of detection of the particular beam, and control means coupled to the detecting means and the moving means and responsive to the mark detection signal for controlling the moving means.

According to another aspect of this invention, there is provided an apparatus for use in machining an object which has a mark extending thereon in a first predetermined direction, the apparatus comprising machining means for machining the object, moving means for moving the object in a second predetermined direction which intersects the first predetermined direction, projecting means for projecting a light beam towards the object, circularly scanning means optically coupled to the projecting means for circularly scanning the object by the light beam to make the mark produce a particular beam whenever the light beam intersects the mark, detecting means for detecting the particular beam to produce a mark detection signal representative of detection of the particular beam, and control means coupled to the detecting means, the moving means, and the machining means and responsive to the mark detection signal for controlling the moving means and the machining means.

DESCRIPTION OF THE PREFERRED EMBODIMENT

Figure 1:
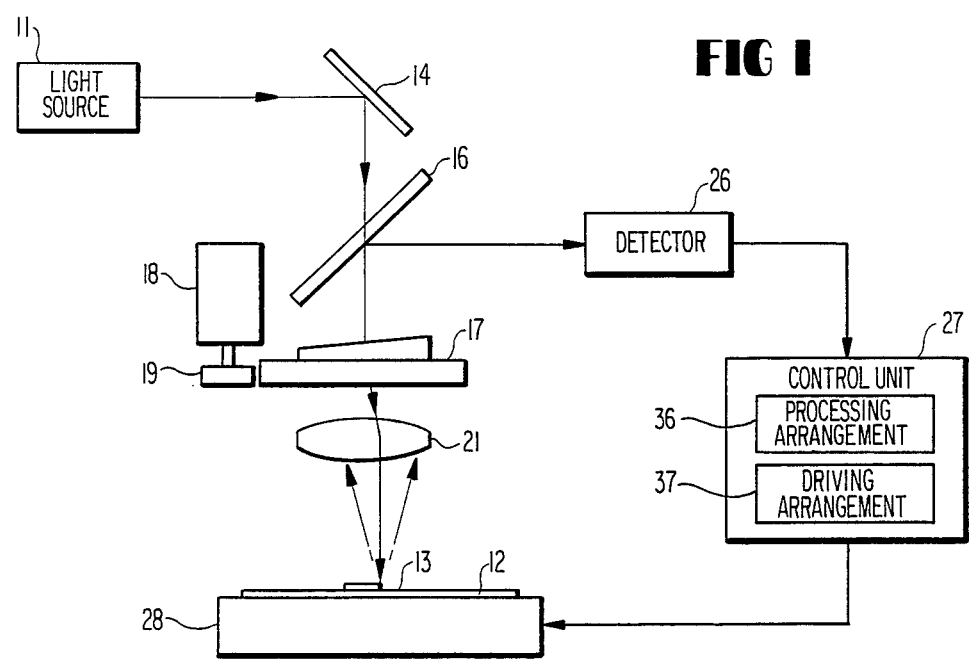
FIG. 1 is a schematic side view of a positioning apparatus according to a first embodiment of this invention.

Referring to FIG. 1, a positioning apparatus according to a first embodiment of the present invention comprises a light source 11 for emitting a light beam, such as a laser beam. The light beam is for optically scanning an object 12, such as a semiconductor wafer. The object 12 has a mark 13 on a top surface, namely, a principal surface which is horizontally extended in the example being illustrated. The mark 13 extends in a first predetermined direction along the principal surface of the object 12.

The light beam is emitted towards a reflecting mirror 14. The reflecting mirror 14 is for reflecting the light beam towards a beam splitter 16. The light beam is incident onto a deflecting member 17 through the beam splitter 16. A combination of the reflecting mirror 14 and the beam splitter 16 serves to optically guide the light beam along a predetermined axis perpendicular to the principal surface of the object 12 and may therefore be referred to as a guiding arrangement.

The deflecting member 17 comprises a tapered transparent glass plate which serves to deflect the light beam from the predetermined axis. The deflecting member 17 is rotated at a constant speed around the predetermined axis by a motor 18 through a power transmission member 19, such as a gear or a pulley. A combination of the motor 18 and the power transmission member 19 is referred to therein as a circularly driving means.

The light beam is incident to an objective lens 21 through the deflecting member 17. The objective lens 21 is for directing the light beam substantial parallel to the predetermined axis and may therefore be referred to as a directing arrangement.

Figure 2:
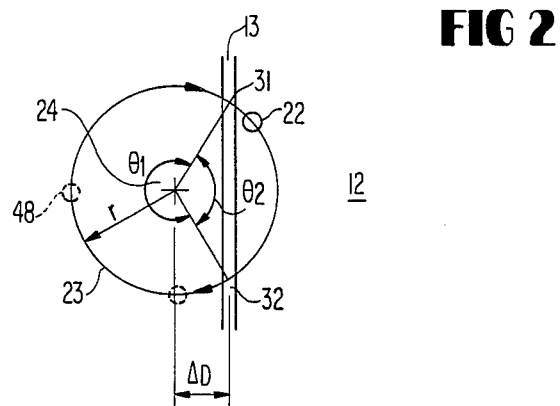
FIG. 2 is a partial tap view of an object which is processed in the positioning apparatus shown in FIG. 1.

The light beam is projected to the principal surface of the object 12 through the objective lens 21 as a light spot 22. As a result, the object 12 is scanned by the light beam as shown in FIG. 2. In FIG. 2, the light spot 22 moves along a circle 23 which surrounds the predetermined axis 24. It is to be noted in this connection that the mark 13 has a width indicated by two parallel lines and a length which extends from upwardly to downwardly of this figure. The circle 23 has a predetermined diameter which is greater than the width of the mark 13 and less than the length of the mark 13 as will be clear in FIG. 2. A combination of the light source 11, the reflecting mirror 14, the beam splitter 16, and the objective lens 21 will referred to as a projecting arrangement. In addition, a combination of the deflecting member 17, the motor 18, and the power transmission member 19 will be referred to herein as a circularly scanning arrangement.

Responsive to the light beam, the mark 13 produces a particular beam whenever the light beam intersects the mark while the light beam circularly scans the object 12. The particular beam passes back through the objective lens 21 and through the deflecting member 17 and then is turned by the half-silvered mirror 16 wide from the predetermined axis.

The particular beam is, for example, a reflection beam reflected from the mark 13. The particular beam may be a diffraction beam diffracted by the mark 13. In either case, the particular beam has a maximum intensity when the light spot 22 falls centrally of the width of the mark 13.

The positioning apparatus further comprises a detector 26, a control unit 27, and a moving unit 28. The particular beam is supplied to the detector 26. Supplied with the particular beam, the detector 26 produces a mark detection signal representative of detection of the mark 13. The mark detection signal is supplied to the control unit 27. Responsive to the mark detection signal, the control unit 27 controls operation of the moving unit 28 as will later be described in detail. The moving unit 28 is for moving the object 12 in a second predetermined direction which is perpendicular to the first predetermined direction.

For positioning the object 12 at a desired position, the positioning apparatus is preset so that the circle 23 intersects two portions, namely, first and second portions 31 and 32 of the mark 13 as shown in FIG. 2. When the light spot 22 is continuously moved along the circle 23 at the constant speed, a succession of particular beams is produced from the mark 13. Responsive to the particular beam succession, the detector 26 produces a succession of mark detection signals which has an output intensity in the manner exemplified in FIG. 3.

Figure 3:
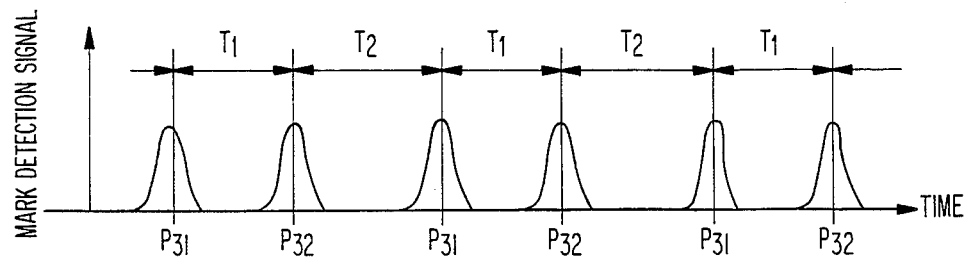
FIG. 3 is a time chart for use in describing operation of the positioning apparatus shown in FIG. 1.

In the example shown in FIG. 3, the mark detection signals $P_{31}$ and $P_{32}$ are alternately produced when the light spot 22 intersects the first and the second portions 31 and 32 of the mark 13. As will be understood from FIG. 3, the mark detection signals $P_{31}$ and $P_{32}$ have first and second time intervals $T_1$ and $T_2$ between two successive ones of the mark detection signals.

Returning again to FIGS. 1 and 2, the control unit 27 comprises a processing arrangement 36 and a driving arrangement 37 as will become clear in the following. The processing arrangement 36 is for processing the mark detection signal succession to produce an error signal representative of a position error of the object 12. The position error is equal to a distance $\Delta D$ between the mark 13 and the predetermined axis 24 and is given by:

$$\Delta D = r \sin\left(\frac{\alpha(T_2 - T_1)}{2}\right)$$

where r represents the radius of the circle 23, $\alpha$ representing angular velocity of the light spot 22. Responsive to the error signal, the driving arrangement 37 drives the moving unit 28 to make the position error be zero. In this event, the processing arrangement 36 is referred to as a calculating arrangement for carrying out a predetermined calculation in response to the mark detection signals succession.

Figure 4:
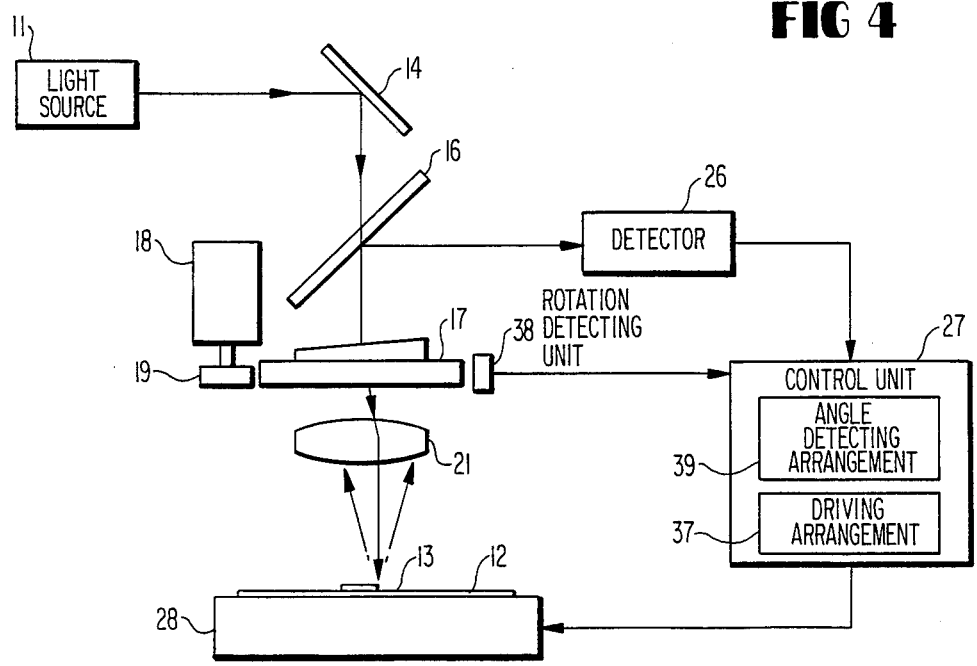
FIG. 4 is a schematic side view of a positioning apparatus according to a second embodiment of this invention.

Referring to FIG. 4, a positioning apparatus according to a second embodiment of this invention comprises similar parts designated by like reference numerals. The positioning apparatus comprises a rotation detecting unit 38 for detecting rotation of the deflecting member 17 to produce a succession of additional detection signals. The rotation detecting unit 38 is referred to herein as an additional detecting arrangement. The additional detection signal succession is supplied to the control unit 27.

The control unit 27 comprises an angle detecting arrangement 39 for detecting difference between angles which are depicted by $\theta_1$ and $\theta_2$ in FIG. 2. The angle $\theta_1$ and $\theta_2$ are defined by straight lines drawn from the predetermined axis 24 to the first and the second portions 31 and 32, respectively. Responsive to the mark detection signal succession and the additional detection signal succession, the angle detecting arrangement 39 produces an angle signal corresponding to the error signal. In practice, the angle detecting arrangement 39 carries out a predetermined calculation in response to the mark detection signal succession and the additional detection signal successions to produce the angle signal and may therefore be preferred to herein as a calculation arrangement. Responsive to the angle signal, the driving arrangement 33 drives the moving unit 28 to make the position error be zero.

Figure 5:
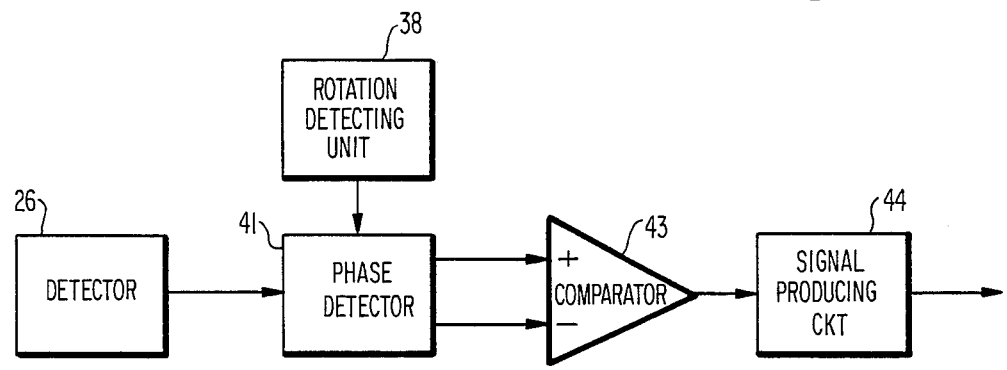
FIG. 5 is a block diagram of a part of a positioning apparatus according to third embodiment of this invention.

Referring to FIG. 5, a positioning apparatus according to a third embodiment of this invention comprises similar parts designated by like reference numerals as in FIG. 4. The control unit 27 comprises a phase detector 41, a comparator 43, and a signal producing circuit 44. It is to be noted in this connection that the mark detection signal succession has a phase variable in the manner depicted in FIG. 3. The phase detector 41 is for detecting the phase of the mark detection signal succession with reference to the additional detection signal to produce a first and a second time signal representative of the first and the second time intervals $T_1$ and $T_2$, respectively, shown in FIG. 3. The phase detector 41 is referred to herein as a first internal processing arrangement. Each of the first and the second time signals is expressed by a voltage value and is supplied to the comparator 43.

The comparator 43 is for comparing the first time signal with the second time signal to continuously produce a comparison result signal only when the first and the second time signals are different from one another. The comparison result signal is supplied to the signal producing circuit 44. Responsive to the comparison result signal, the signal producing circuit 44 produces the error signal. A combination of the comparator 43 and the signal producing circuit 44 is referred to herein as a second internal processing arrangement. Responsive to the error signal, the driving arrangement 37 drives the moving unit 28 until the position error becomes zero.

When the object 12 is positioned at the desired position, the comparison result signal disappears because the first and the second time signals are equal to one another. Responsive to disappearance of the comparison result signal, the signal producing circuit 44 produces a completion pulse signal in place of the error signal. The completion pulse signal is representative of completion of positioning of the object 12. Responsive to the completion pulse signal, the driving arrangement 37 stops operation of the moving unit 28.

Referring again to FIGS. 2 and 4, description will be made about a fourth embodiment in the following. The deflecting member 17 has a particular mark. Dependent on the particular mark, the rotation detecting unit 38 produces a particular detection signal whenever the deflecting member 17 rotates one. Namely, the particular detection signal generates when the rotation detecting unit 38 detects the particular mark.

It is assumed that, when the particular mark is detected, the laser beam is positioned at a position 48 on the circle 23 shown in FIG. 2. The angle detecting arrangement 39 counts-up in dependence on clock signals when the deflecting member 17 scans the laser beam from the position 48 to the first portion 31. When the laser beam scans from the first portion 31 to the second portion 32, the angle detecting arrangement 39 counts-down. When the laser beam scans from the second portion 32 to the position 48, the angle detecting arrangement 39 counts-up. Therefore, count value of the angle detecting arrangement 39 is zero only when the angles $\theta_1$ and $\theta_2$ are equal to one another.

The angle detecting arrangement 39 produces an internal output signal representative of the count value. Responsive to the internal output signal, the driving arrangement 33 drives the moving unit 28 until the count value becomes zero.

Figure 6:
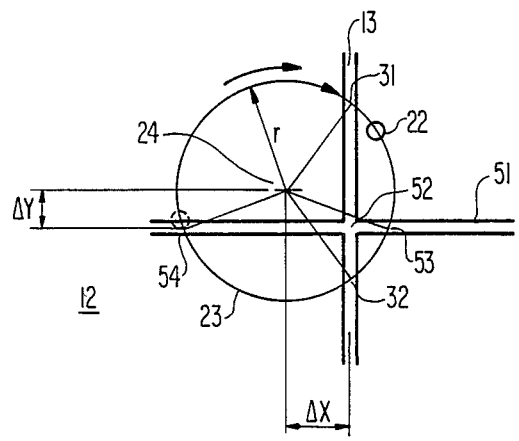
FIG. 6 is a fragmentary top view of an object which is processed in a modification of the positioning apparatus depicted in FIG. 1.
Figure 7:
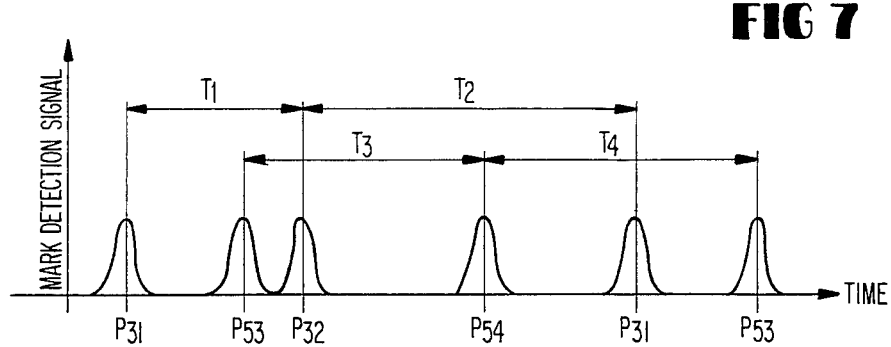
FIG. 7 is a time chart for use in describing operation of the modification mentioned in conjunction with FIG. 6.

Referring to FIGS. 6 and 7 in addition to FIG. 1, description will proceed to a modified embodiment of this invention. The object 12 has an additional mark 51 in addition to the mark 13. For convenience of description, the mark 13 will be called a main mark in the following. The additional mark 51 extends in the second direction along the principal surface of the object 12 to intersect the main mark 13.

For positioning the object 12 at the desired position, the positioning apparatus is preset so that the circle 23 surrounds a point of intersection 52 of the main and the additional marks 13 and 51. As a result, the circle 23 intersects a third and a fourth portions 53 and 54 of the additional mark 51 in addition to the first and the second portions 31 and 32 of the main mark 13.

When the light spot 22 continuously moves along the circle 23 at the constant speed, a succession of particular beams is produced from the main and the additional marks 13 and 51. Responsive to the particular beam succession, the detector 26 produces a succession of mark detection signals which has an output intensity in the manner exemplified in FIG. 7.

In FIG. 7, the mark detection signals $P_{31}$, $P_{32}$, $P_{53}$, $P_{54}$ are produced when the light spot 22 intersects each of the first through the fourth portions 31, 32, 53, and 54. As will be understood from FIG. 7, the mark detection signals $P_{31}$, $P_{32}$, $P_{53}$, $P_{54}$ have third and fourth time intervals $T_3$ and $T_4$ in addition to the first and the second time intervals $T_1$ and $T_2$ in the manner described in conjunction with FIG. 3.

The processing arrangement 36 carries out a first predetermined calculation relating to the first and the second time intervals $T_1$ and $T_2$ to produce a first error signal representative of a first distance $\Delta X$ which is shown in FIG. 6. The first distance $\Delta X$ is given by:

$$\Delta X = r \sin\left(\frac{\alpha(T_2 - T_1)}{2}\right)$$

where r represents the radius of the circle 23, $\alpha$ representing angular velocity of the light spot 22. In this event, the processing arrangement 36 serves as a first calculating arrangement.

In addition, the processing arrangement 36 carries out a second predetermined calculation relating to the third and the fourth time intervals $T_3$ and $T_4$ to produce a second error signal representative of a second distance $\Delta Y$ which is shown in FIG. 6. The second distance $\Delta Y$ is given by:

$$\Delta Y = r \sin\left(\frac{\alpha(T_4 - T_3)}{2}\right)$$

where r represents the radius of the circle 23, $\alpha$ representing angular velocity of the light spot 22. In this event, the processing arrangement 36 serves as a second calculating arrangement.

Responsive to the first and the second error signals, the driving arrangement 37 drives the moving unit 28 to make each of the first and the second distance $\Delta X$ and $\Delta Y$ be zero.

Figure 8:
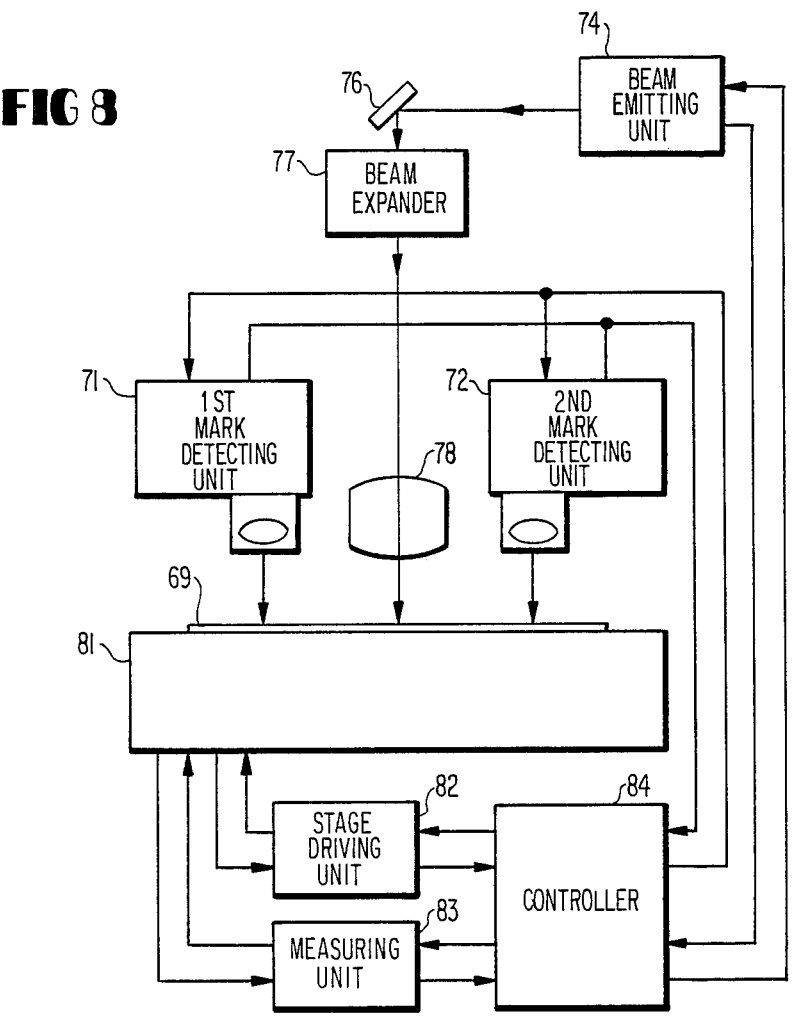
FIG. 8 is a schematic diagram of a machining apparatus according to an embodiment of this invention.

Referring to FIG. 8, a machining apparatus according to an embodiment of this invention is for machining an object 69, such as a semiconductor wafer, and includes first and second mark detecting units 71 and 72. The object 69 has a circuit pattern and a first and a second positioning area. Each of the first and the second positioning areas has a primary and a secondary mark which perpendicular to one another. The primary marks are colinearly formed along a predetermined straight line. As a result, the secondary marks are parallel to one another.

The first and the second mark detecting units 71 and 72 are for optically detecting each mark in the first and the second positioning areas and comprise the moving, the projecting, the circularly scanning, and the detecting arrangements which are described earlier in detail. Responsive to detection of each mark, the first and the second mark detecting units 71 and 72 produce a first and a second local mark detection signal in the manner which is described before in conjunction with FIGS. 1 through 7 and will be later described in again.

The machining apparatus further comprises a beam emitting unit 74 for emitting a machining laser beam of a small diameter towards a reflecting mirror 76. The machining laser beam is reflected by the reflecting mirror 76 towards a beam expander 77 which is for expanding the small diameter to produce an expanded beam. The expanded beam is collected on a desired part of the circuit pattern of the object 69 through an objective lens 78 and serves to carry out laser beam machining, such as a cutting of the desired part or a trimming thereof. A combination of the beam emitting unit 74, the reflecting mirror 76, the beam expander 77, and the objective lens 78 will be referred to as a machining arrangement.

The machining apparatus further comprises a stage 81, a stage driving unit 82, a measuring unit 83, and a controller 84. The stage 81 is rotatable around a predetermined vertical center axis and is movable in a first and a second predetermined horizontal direction which are perpendicular to one another. The object 69 is supported on the stage 81. The stage driving unit 82 is for driving the stage 81. The first and the second mark detecting units 71 and 72 are aligned in the first predetermined horizontal direction. The measuring unit 83 is for measuring the position of the stage 81 to produce a position signal representative of information related to the position of the stage 81. The controller 84 is for controlling each of the first mark detecting, the second mark detecting, the beam emitting, the stage driving, and the measuring units 71, 72, 74, 82, and 83.

Before the laser beam machining is carried out in the machining apparatus, the object 69 is preset on the stage 81 so that the first and the second positioning areas are opposite to the first and the second mark detecting units 71 and 72, respectively. In this condition, it is assumed that the object 69 has a position error.

For detecting the position error of the object 69, the first and the second detecting units 71 and 72 are put into operation of producing the fist and the second local mark detection signals. Responsive to the first and the second local mark detection signals, the controller 84 produces various error signals which will later be described in detail. Responsive to the error signals, the stage driving unit 82 drives the stage 81 to make the position error be zero as will become clear in the following.

It is assumed that the primary marks of the first and the second positioning areas have a first and a second local position error, respectively. Each of the first and the second local position errors corresponds to a distance between the primary mark and the predetermined axis which is depicted by the reference numeral 24 in FIG. 2.

Dependent on the first and the second local position errors, the controller 84 produces an angle error signal representative of an angle error which is defined between the predetermined straight line and the first predetermined horizontal direction. Responsive to the angle error signal, the stage driving unit 82 moves the stage 81 around the predetermined vertical center axis until the first local position error is equal to the second local position error. As a result, correction is complete as regards the angle error of the object 69.

In addition, the controller 84 produces a first position error signal in dependence on the first and the second local position errors. Responsive to the first position error signal, the stage driving unit 82 moves the stage 81 in the second predetermined horizontal direction until the first and the second local position errors become zero. As a result, correction is complete as regards the position error of the object 69 in the second predetermined horizontal direction.

It is assumed that the secondary marks of the first and the second positioning areas have a third local position error in the first predetermined horizontal direction. Dependent on the third local position error, the controller 84 produces a second position error signal. Responsive to the second position error signal, the stage driving unit 82 moves the stage 81 in the first predetermined horizontal direction until the third local position error becomes zero. As a result, correction is complete as regards the position error of the object 69 in the first predetermined horizontal direction.

Before the laser beam machining is carried out in the machining apparatus, the controller 84 is supplied with an original data signal through an input unit (not shown). The original data signal is representative of information related to a position of each of the desired part and each mark. Responsive to the original data signal and the above-mentioned position signal, the controller 84 makes the stage driving unit 82 move the stage 81 until the desired part of the object 69 reaches a machining position which is opposite to a central portion of the objective lens 78. In the machining position, the machining arrangement is capable of machining the desired part of the object 69 by the machining laser beam.

While this invention has thus far been described in conjunction with few embodiments thereof, it will readily be possible for those skilled in the art to put this invention into practice in various other manners. For example, the light spot 22 may be moved along a closed curve other than a circle, such as an ellipse.

What is claimed is:

1. A positioning apparatus for use in positioning an object which has a mark extending thereon in a first predetermined direction, said positioning apparatus comprising:

moving means for moving said object in a second predetermined direction which intersects said first predetermined direction;

projecting means for projecting a light beam towards said object;

circularly scanning means optically coupled to said projecting means for circularly scanning said object by movement of said light beam to make said mark produce a particular beam whenever said light beam intersects said mark;

detecting means for detecting said particular beam to produce a mark detection signal representative of detection of said particular beam; and control means coupled to said detecting means and said moving means and responsive to said mark detection signal for controlling said moving means.

2. A positioning apparatus as claimed in claim 1, said mark having a predetermined width in a third predetermined direction which is perpendicular to said first predetermined direction, wherein said projecting means comprises directing means optically coupled o said circularly scanning means for directing said light beam to make said light beam scan said object along a circle having a predetermined diameter which is greater than said predetermined width.

3. A positioning apparatus as claimed in claim 2, said mark having a predetermined length in said first predetermined direction, wherein said detecting means is for further determining said circle so that said predetermined diameter is less than said predetermined length.

4. A positioning apparatus as claimed in claim 1, said object having a principal surface wherein said projecting means comprises guiding means for optically guiding said light beam along a predetermined axis which is perpendicular to said principal surface;

said circularly scanning means comprising:

deflecting means optically coupled to said guiding means for deflecting said light beam from said predetermined axis; and circularly driving means coupled to said deflecting means for circularly driving said deflecting means around said predetermined axis to make said light beam circularly scan said object.

5. A positioning apparatus as claimed in claim 1, wherein said control means comprises:

processing means coupled to said detecting means for processing said mark detection signal into an error signal representative of a position error of said object; and driving means coupled to said processing means and said moving means and responsive to said error signal for driving said moving means to correct said position error.

6. A positioning apparatus as claimed in claim 5, wherein said processing means comprises calculating means coupled to said detecting means and responsive to said mark detection signal for carrying out a predetermined calculation to produce a calculated signal as said error signal.

7. A positioning apparatus as claimed in claim 5, further comprising additional detecting means operatively coupled to said circularly scanning means and said processing means for detecting operation of said circularly scanning means to produce an additional detection signal, said processing means being for further processing said mark detection signal with reference to said additional detection signal to said error signal.

8. A positioning apparatus as claimed in claim 7, said processing means comprising calculating means coupled to the first-mentioned detecting means and said additional detecting means and responsive to said mark detection signal for carrying out a predetermined calculation with reference to said additional detection signal to produce a calculated signal as said error signal.

9. A positioning apparatus as claimed in claim 7, wherein said processing means comprises:

first internal processing means coupled to the first-mentioned detecting means and said additional detecting means for processing said mark detection signal with reference to the said additional detection signal to produce a time signal related to a time instant at which said mark detection signal is produces by the first-mentioned detecting means; and second internal processing means coupled to said first internal processing means and said driving means and responsive to said time signal for processing said time signal to a processed signal as said error signal.

10. An apparatus for use in machining an object which has a mark extending thereon in a first predetermined direction, said apparatus comprising:

machining means for machining said object;

moving means for moving said object in a second predetermined direction which intersects said first predetermined direction;

projecting means for projecting a light beam towards said object;

circularly scanning means optically coupled to said projecting means for circularly scanning said object by said light beam to make said mark produce a particular beam whenever said light beam intersects said mark;

detecting means for detecting said particular beam to produce a mark detection signal representative of detection of said particular beam; and control means coupled to said detecting means, said moving means, and said machining means and responsive to said mark detection signal for controlling said moving means and said machining means.

* * * * *

UNITED STATES PATENT AND TRADEMARK OFFICE
CERTIFICATE OF CORRECTION

PATENT NO. : 4,818,879

DATED : April 4, 1989

INVENTOR(S) : TOSHIKAZU KAJIKAWA

It is certified that error appears in the above-identified patent and that said Letters Patent is hereby corrected as shown below:

Col. 3, line 31, after "will" insert --be--.

Col. 7, line 44, delete "fist" and insert --first--.

Col. 8, line 66, delete "o" and insert --to--.

Col. 10, lines 17 & 18, delete "produces" and insert --produced--.

Signed and Sealed this

Seventeenth Day of October, 1989

Attest:

DONALD J. QUIGG

Attesting Officer

Commissioner of Patents and Trademarks